Patented June 24, 1930

1,766,785

UNITED STATES PATENT OFFICE

ROBERT GRIESSBACH, OF LUDWIGSHAFEN-ON-THE-RHINE, AND OTTO SCHLIEPHAKE AND OTTO HEUSLER, OF MANNHEIM, GERMANY, ASSIGNORS TO I. G. FARBEN-INDUSTRIE AKTIENGESELLSCHAFT, OF FRANKFORT-ON-MAIN, GERMANY, A CORPORATION OF GERMANY

PRODUCTION OF CALCIUM NITRATE, ALUMINA, AND PHOSPHORUS

No Drawing. Application filed January 17, 1928, Serial No. 247,453, and in Germany January 24, 1927.

When phosphorus is produced by reduction by fusion of raw phosphates with the addition of silica, calcium silicate slags are obtained for which, however, there is little use. It has therefore already been proposed to modify the composition of the slag, by suitable additions, so as to produce Portland cement, or to replace the silica by alumina and thus obtain alumina as a by-product through the intermediate stage of calcium aluminate.

We have now found that the production of alumina from the calcium aluminate obtained in the production of phosporus by the thermal process by employing aluminous material as an addition, may be combined with the production of calcium nitrate, which is an excellent fertilizer.

According to the present invention raw phosphates, especially those which are rich in aluminium, are mixed with coal and aluminous material, such as bauxite, clay and the like, the phosporus being expelled as such or in the form of oxide, in any known or suitable manner, by heating in any suitable apparatus, as for example in an electric furnace, and subjected to further treatment in the usual way.

The operation is preferably carried on in such a way that a slag as low as possible in iron is obtained, by reducing the contaminating iron oxide to the metallic state and enabling this to be tapped as phosphide-bearing pig iron.

If the additions of aluminous material be suitably selected the slag may be obtained in such a condition that it breaks up into lumps or powder, during or after cooling on removal from the furnace; this is especially the case when its content of calcium oxid lies between 60 and 45 per cent, its content of aluminium and ferric oxids lies between 10 and 40 per cent and its content of silica lies between 30 and 10 per cent. If necessary, the crushing may be completed by mechanical means. Slags of the specified composition are particularly easy to decompose with acids.

The mass, which has crumbled down on cooling or has been mechanically reduced in any other way, is treated with nitric acid, whereupon calcium and aluminium pass into solution as nitrates, leaving the silica in a condition that can be easily filtered. After separation from the acid solution, the silica may be treated in any known or suitable manner and utilized, for example as an adsorbent, insulating material or for improving the condition of soil. The aluminium, together with any iron present, is precipitated from the acid solution by means of milk of lime or calcium carbonate, in the state of hydroxid, the resulting precipitate being purified if necessary. The filtrate is concentrated, and the calcium nitrate transformed into the solid state.

The process herein described has the advantages inter alia that the lime content of the slags is recovered in a form which can be utilized and that alumina is recovered at the same time from materials low in alumina, such as kaolin, clay, loam, and the like, without any appreciable increase in the amount of slag produced.

The precipitate of aluminium hydroxide obtained by throwing down the aluminium with milk of lime is very voluminous and is extremely difficult to filter and wash. This superficial area of the precipitated substance is considerably reduced by the addition of suitable superficially-active substances, thereby ensuring rapid filtration, which can be carried out in a simple apparatus, and at the same time the washing is rendered easier and more complete.

Such superficially-active substances are for example oily liquids which are only slightly soluble in water, and especially those which diminish the surface tension, as for example, the oils of brown-coal tar and coal tar, tetrahydronaphthalene, and the like. Small quantities of these substances are sufficient, generally speaking a few tenths of 1 per cent, with reference to the amount of the precipitate obtained, added to the solution to be precipitated, or to the solution or suspension of the precipitant.

The following example will further illustrate the nature of the said invention, but the invention is not limited thereto.

Example 700 kilos of a Morocco phosphate containing 50 per cent of CaO, 34 per cent of $P_2O_5$, 1 per cent of $Al_2O_3$, 0.7 per cent of $Fe_2O_3$ and 3 per cent of $SiO_2$ are mixed with 220 kilos of kaolin, containing 39 per cent of $Al_2O_3$, 47 per cent of $SiO_2$ and 14 per cent of $H_2O$, and also with 100 kilos of coal. By heating the mixture to 1600° C. in an electric furnace, 100 kilos of phosphorus are driven off. Pig iron, rich in phosphide, collects at the bottom of the furnace, about 5 kilos being obtained on tapping. The slag is run out, and crumbles to a fine powder on cooling. This powder is treated with 40 per cent nitric acid, and the residual silica, 125 kilos, is separated by filtration. The acid solution is treated with calcium carbonate, or milk of lime, to throw down the aluminium, and after separation of the precipitate which may be purified in any desired manner, about 85 kilos of $Al_2O_3$ are obtained. The filtrate is concentrated and treated in any known or suitable manner for the recovery of solid calcium nitrate, of which over 1200 kilos are obtained. In precipitating the alumina it is advisable to add superficially-active substances. For example, 1 kilo of tar oil is added for each 100 kilos of aluminium nitrate contained in the solution, and the precipitation is carried on at boiling heat with milk of lime. The precipitate is then filtered by suction and washed. The filtration and washing of the precipitate from each 100 kilos of aluminium nitrate takes 3½ hours, as compared with 10 hours when no additions are used. When tar oil has been added, the precipitate of aluminium hydroxid contains 0.56 per cent of nitrogen whereas, without such addition, it contains 2.95 per cent of nitrogen.

What we claim is:

1. A process for producing calcium nitrate together with alumina and phosphorus which comprises fusing a raw phosphate with coaly matter and an aluminous material and, after expelling the phosphorus, treating the resulting slag with nitric acid, filtering off silica, precipitating the aluminium with a compound of calcium capable of forming an insoluble aluminium compound when brought into contact with an aluminium salt solution, and separating the calcium nitrate solution from the precipitated aluminium compound.

2. A process for producing calcium nitrate together with alumina and phosphorus which comprises fusing a mixture of a raw phosphate with coal and clay and, after expelling the phosphorus, treating the resulting slag with nitric acid, filtering off silica, precipitating the aluminium with a compound of calcium capable of forming an insoluble aluminium compound when brought into contact with an aluminium salt solution, and separating the calcium nitrate solution from the precipitated aluminium compound.

3. A process for producing calcium nitrate together with alumina and phosphorus which comprises mixing a raw phosphate with coaly matter and an amount of aluminous material sufficient for the production of a slag consisting of from 45 to 60 per cent of calcium oxid, from 10 to 40 per cent of aluminium and ferric oxides and from 10 to 30 per cent of silica and, after expelling the phosphorus, treating the resulting slag with nitric acid, filtering off silica, precipitating the aluminium with a compound of calcium capable of forming an insoluble aluminium compound when brought into contact with an aluminium salt solution, and separating the calcium nitrate solution from the precipitated aluminium compound.

4. A process for producing calcium nitrate together with alumina and phosphorus which comprises fusing a raw phosphate with coaly matter and an aluminous material, expelling the phosphorus by heating, drawing off the iron, treating the resulting slag with nitric acid, filtering off silica, precipitating the aluminium with a compound of calcium capable of precipitating alumina when brought into contact with an aluminium salt solution, and separating the calcium nitrate from alumina by filtration.

5. A process for producing calcium nitrate together with alumina and phosphorus which comprises fusing a raw phosphate with coaly matter and an aluminous material, expelling the phosphorus by heating, drawing off the iron, treating the resulting slag with nitric acid, filtering off silica, precipitating the aluminium with a compound of calcium capable of precipitating alumina when brought into contact with an aluminium salt solution in the presence of superficially-active compounds and on heating, and separating calcium nitrate from alumina by filtration.

6. A process for producing calcium nitrate together with alumina and phosphorus which comprises mixing a raw phosphate with coaly matter and an aluminous material, expelling the phosphorus by heating to 1600° C., drawing off the iron, treating the resulting slag with nitric acid, filtering off silica, precipitating, while heating, the aluminium with milk of lime in the presence of small quantities of superficially-active compounds and separating calcium nitrate from alumina by filtration.

7. A process for producing calcium nitrate together with alumina and phosphorus which comprises mixing a raw phosphate with coaly matter and an aluminous material, expelling the phosphorus by heating to 1600° C., drawing off the iron, treating the resulting slag with nitric acid, filtering off silica, precipitating, while heating, the aluminium with milk of lime in the presence of small quantities of tar oil and separating calcium nitrate from alumina by filtration.

In testimony whereof we have hereunto set our hands.

ROBERT GRIESSBACH.
OTTO SCHLIEPHAKE.
OTTO HEUSLER.